United States Patent
Chen et al.

(10) Patent No.: US 10,157,244 B2
(45) Date of Patent: Dec. 18, 2018

(54) MODEL DRIVEN CONNECTION APPROXIMATION FOR MECHANICAL, ELECTRICAL AND PLUMBING DRAWINGS

(75) Inventors: Henry Chen, Beijing (CN); Jiangeng Du, Beijing (CN); Xiaoli Wang, Beijing (CN); Yan Xia, Beijing (CN); Liana Maria Kiff, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 657 days.

(21) Appl. No.: 14/407,196

(22) PCT Filed: Jun. 25, 2012

(86) PCT No.: PCT/CN2012/077417
§ 371 (c)(1),
(2), (4) Date: May 19, 2015

(87) PCT Pub. No.: WO2014/000139
PCT Pub. Date: Jan. 3, 2014

(65) Prior Publication Data
US 2015/0286750 A1    Oct. 8, 2015

(51) Int. Cl.
*G06F 17/50*    (2006.01)
*G06T 7/00*    (2017.01)
*G06K 9/00*    (2006.01)

(52) U.S. Cl.
CPC ..... *G06F 17/5004* (2013.01); *G06K 9/00476* (2013.01); *G06T 7/001* (2013.01);
(Continued)

(58) Field of Classification Search
CPC ............... G06F 17/5004; G06F 17/509; G06F 2217/34; G06K 9/00476; G06T 7/001;
(Continued)

(56) References Cited

U.S. PATENT DOCUMENTS 6,134,338 A * 10/2000 Solberg .............. G06K 9/00476
382/113
6,314,194 B1 * 11/2001 Michael .............. G06F 17/5045
250/559.34

(Continued)

FOREIGN PATENT DOCUMENTS

CN          102223553 A     10/2011
WO     WO-2014/000139 A1    1/2014

OTHER PUBLICATIONS

Device_Defined New Riverside University Dictionary, The Riverside Publishing Company, 1994, Houghton Mifflin Company.*
(Continued)

*Primary Examiner* — Brian S Cook
(74) *Attorney, Agent, or Firm* — Schweegman Lundberg & Woessner, P.A.

(57) ABSTRACT

A system displays a raster-based or a vector-based formatted drawing on a user interface. A user selects a device on the drawing. The selected device is classified on a template. The drawing is searched for the classified template. Three-dimensional characteristics are imbued to the selected device. Connection types among different types of devices on the drawing are received into the system. A search is performed for all connection instances throughout the drawing using the received connection types. An object oriented and three-dimensionally, spatially referenced view of the drawing is generated on a user interface.

17 Claims, 8 Drawing Sheets

(52) U.S. Cl.
CPC ........ *G06F 17/509* (2013.01); *G06F 2217/34* (2013.01); *G06T 2207/10004* (2013.01); *G06T 2207/30108* (2013.01); *G06T 2207/30176* (2013.01)

(58) Field of Classification Search
CPC . G06T 2207/10004; G06T 2207/30108; G06T 2207/30176
USPC .............................................. 703/1
See application file for complete search history.

(56) References Cited

U.S. PATENT DOCUMENTS

| | | | |
|---|---|---|---|
| 7,587,061 B1* | 9/2009 | Pacenti | G06K 9/00476 382/100 |
| 7,783,523 B2* | 8/2010 | Lopez | G06Q 10/087 700/97 |
| 2009/0015585 A1* | 1/2009 | Klusza | G06F 17/3028 345/420 |
| 2010/0251028 A1* | 9/2010 | Reghetti | G06F 17/5004 714/39 |
| 2012/0050464 A1 | 3/2012 | Chen et al. | |

OTHER PUBLICATIONS

Yamada (An Optimal Design of Piping Route in a CAD System for Power Plant, Computer Math. Applic. vol. 35, No. 6, pp. 137-149, 1998.*
Holland_2011 (Duct Layout dated Dec. 1, 2011 downloaded from https://web.archive.org/web/20111201043708/http://www.designmaster.biz/products/hvac/ . . . ).*
Griffin_2006 (Double Line Duct to Single Line Duct, AutoCAD MEP Forum, dated May 18, 2002, downloaded from https://forums.autodesk.com/t5/autocad-mep-forum/double-line-duct-to-single-line-duct/td . . . ).*
CSOFT 2009 (Demo Plan Tracer (CSOFT) data Sep. 2, 2009, downloaded from Youtube https://www.youtube.com/watch?v=4koUy-D-RcM ).*
Bazjanac_2005 (Bazjanac, V., et al. HVAC Component Data Modeling Using Industry Foundation Classes, Nov. 29, 2005 downloaded from http://gaia.lbl.gov/btech/papers/51365.pdf).*
PlanTracerADT2008 (PlanTracer , PlanTracer for AutoCAD Architecture, CSoft AS, Norway, 2008).*
"International Application Serial No. PCT/CN2012/077417, International Preliminary Report on Patentability dated Dec. 31, 2014", 4 pgs.
"International Application Serial No. PCT/CN2012/077417, International Search Report dated Apr. 4, 2013", 2 pgs.
"International Application Serial No. PCT/CN2012/077417, Written Opinion dated Apr. 4, 2013", 3 pgs.

* cited by examiner

MODEL DRIVEN CONNECTION APPROXIMATION FOR MECHANICAL, ELECTRICAL AND PLUMBING DRAWINGS

TECHNICAL FIELD

The present disclosure relates to a system and method for model driven connection approximation for mechanical, electrical, and plumbing (MEP) drawings.

BACKGROUND

Connection or supply relationships among different devices in a mechanical, electrical, and plumbing (MEP) system can provide important information for various applications. These applications include Auto Fault Detection (AFD), Energy Consumption Monitoring, Prediction and Simulation, and Graphics of a Duct Network. While it is feasible to get the connection relationships via the IfcRelationship and 3D Geometry analysis if building information model (BIM) data are available, most legacy buildings don't have BIM data. Rather, these buildings only have CAD drawings (which are a raster type image (such as BMP, JPG or TIF) or a vector-based file (such as DXF or SVG)) or even just paper drawings (which can be scanned into a raster image).

It is costly to hire architectures or domain experts to manually separate the devices from the paper-based drawing with commercial tools like Revit, and then analyze and determine the connection relationships. Moreover, with a manual process, it is difficult or infeasible to update the model when the CAD drawing is revised.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

An embodiment addresses the above-identified problem with legacy mechanical, electrical, and plumbing (MEP) drawings by recognizing the equipment in such drawings and searching for the interconnections among the different pieces of equipment according to the implicit connection rules in the drawings.

There normally are many pieces of equipment in a paper-based drawing, but there usually are only a few types of equipment in such a drawing. For example, for a heating, ventilation, and air conditioning (HVAC) plan, the models (or types of equipment) are a variable air volume (VAV) terminal box, a diffuser, an air handling unit (AHU), a pump, and a valve. There may be lots of connections among the pieces of equipment, but the connection types are relatively simple. Once again, for an HVAC plan, the connections are always from the AHU supply (or connect) to the VAV, and from the VAV supply (or connect) to the diffuser, and from a wall module control (or connect) to the VAV. In an embodiment, models are used to represent the above equipment types and connections types.

An embodiment first searches a paper based drawing for all equipment for all different models (or types). Then, it allows users to input the connection types. Finally it extracts the interconnections among equipment via searching only human-being readable lines hidden in the drawings. The embodiment provides a logical connection relationship, such as equipment A serves as a supply to equipment B, and it also keeps geometric attributes for the connections, such as the location of the duct network.

Figure 1:
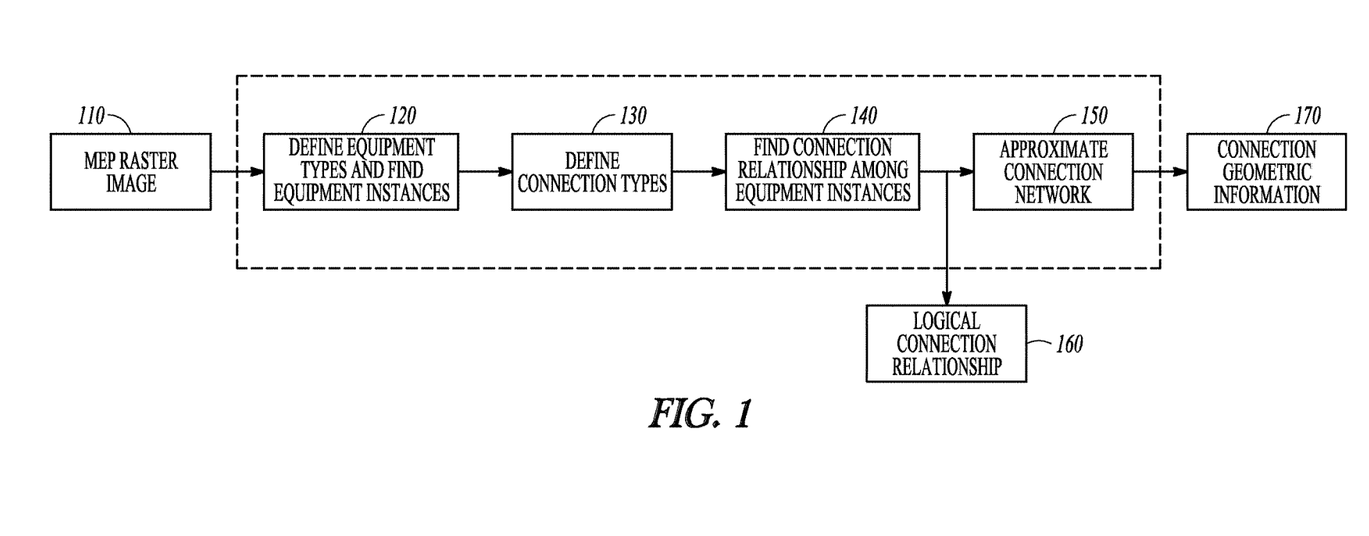
FIG. 1 is a flowchart of an example process of a model driven connection approximation for mechanical, electrical, and plumbing (MEP) drawings.

FIG. 1 illustrates a flowchart of an example process of a model driven connection approximation for mechanical, electrical, and plumbing (MEP) drawings. Such an approximation process begins for example with an MEP raster image 110. At 120, equipment types are defined and equipment instances in the drawing are located. For each equipment model or type, a user can select or mark a sample of the model via a mouse click. After this selection, the process searches for all instances of the equipment type according to features in the selected sample, and retrieves properties for each instance of the selected equipment type. In the HVAC situation, the types are identified (such as diffuser, VAV, and AHU), and the locations of these types in the drawing are noted.

At 130, the connection types are defined. Once again, for an HVAC system, the connection types are typically that an AHU connects to (i.e., supplies) a VAV, a VAV connects to (i.e., supplies) a diffuser, and a wall module connects to (i.e., controls) a VAV. At 140, connections among the equipment instances are found. For each connection model, the source equipment according to its type is obtained, and then the lines (or curves) from the source equipment to a piece of destination equipment is noted. At 160, the determined logical connection relationship is exported to a processor or related system. At 150, the entire connection network is approximated, and at 170 the connection geometry information is output to a processor or related system.

Figure 2:
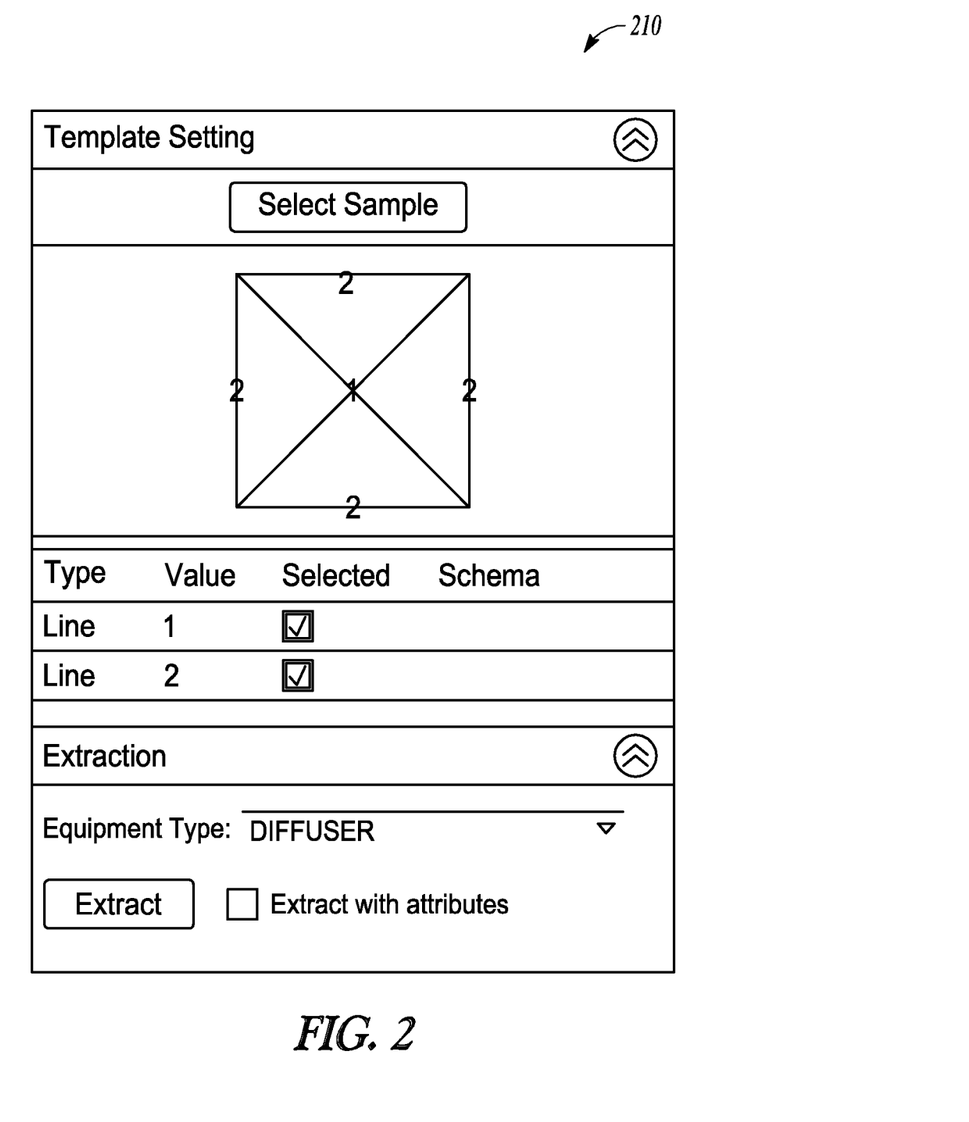
FIG. 2 is an example user interface for use in connection with a model driven connection approximation.

FIG. 2 is an example user interface for use in connection with a model driven connection approximation, and in particular, for the selection of equipment types from a drawing. A user, using a template 210, selects a sample of equipment from the drawing and sets equipment type (like a diffuser). The system then uses the template to find all instances in the drawing that are similar to the selected sample, and the system sets their types as the same type as the selected sample. Specifically, the selected sample is represented using features, pixel density, and length of ratio. Then, instances in the drawing with the same size and similar feature representation as the selected sample are detected. The equipment type of the detected instances is set to the same type as the selected sample. Thereafter, text is associated with the instance. In an embodiment, an analysis is used to find independent regions as text regions. Optical character recognition (OCR) is used on each text region and the position of each text region is recorded. For complex objects on the drawing, a user can simply select the complex object with the mouse and set its equipment type.

Figure 3:
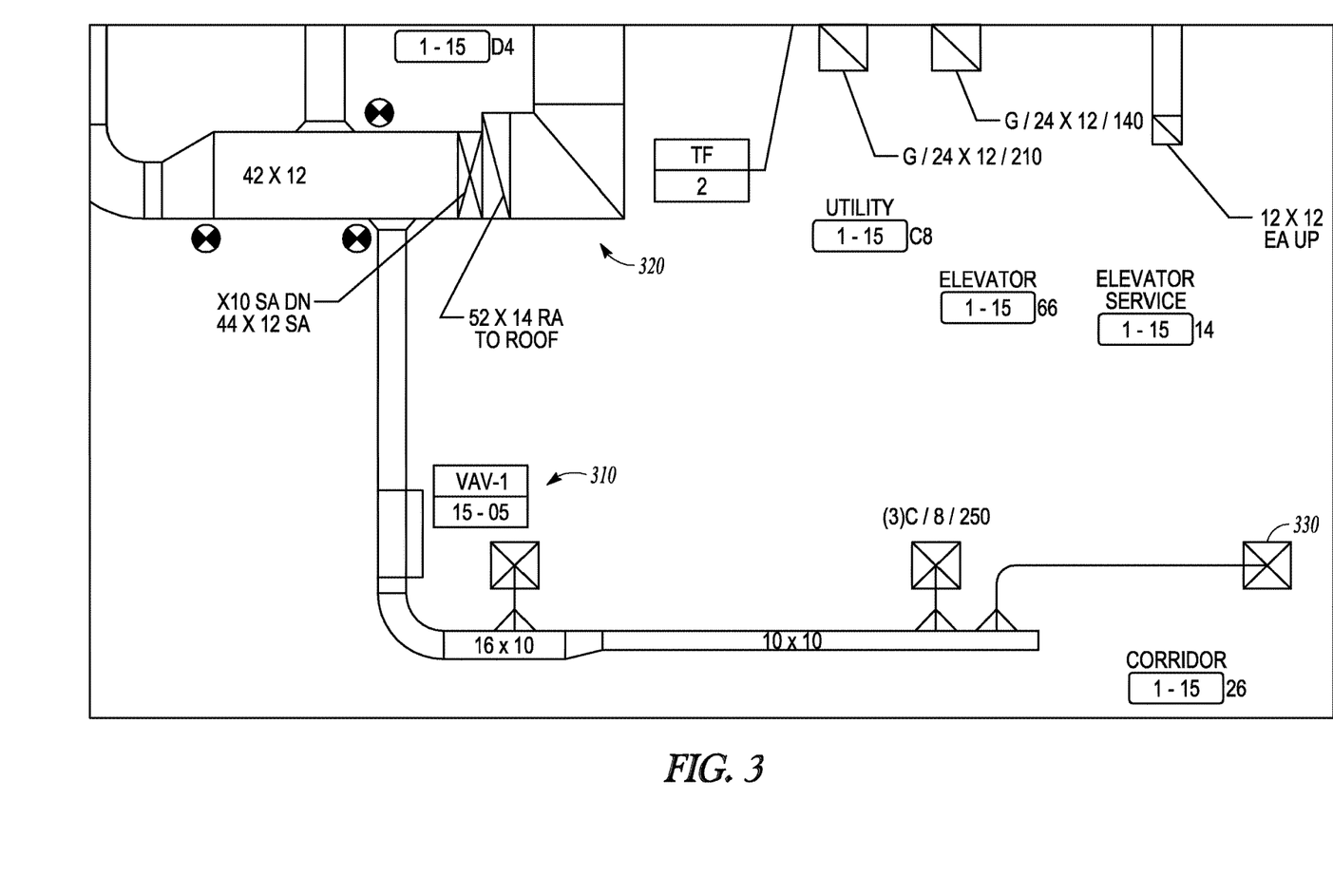
FIG. 3 is an example of an MEP drawing.

FIG. 3 is an example of an MEP drawing. FIG. 3 illustrates in particular an AHU object 320, including a connection to a VAV 310, which in turn is connected to a diffuser 330. It is a drawing such as that illustrated in FIG. 3 that is used in the model based approximation. The input connection model can be selected from a drop down list, or a user can specifically specify the connections. In either event, the specified connections are those such as an AHU connects to a VAV, a VAV connects to a diffuser, and a wall module connects to a VAV. After the connection relationships are established via the dropdown menu or direct input from the user, as explained in more detail in the following paragraph, the drawing in FIG. 3 is searched for these connection relationships.

A graph structure is generated to represent a logical graph. Nodes in the graph are all equipment instances that were found. The properties (type, name, location, etc.) of the nodes are set. Then, for each equipment instance in the graph, the connection is searched using these steps. The related connection model is obtained according to the type of source equipment. All the lines and curves are traversed from the source equipment until a detection of another equipment instance (referred to as the destination equipment instance). Then, it is determined if the connection from the source equipment to the destination equipment complies with the connection model. If the connection complies with the connection model, the connection is added as an edge in the graph, and all lines or curves along the connection in the edge are recorded. The connection graph is then output to a user interface, processor, or system.

Figure 4A:
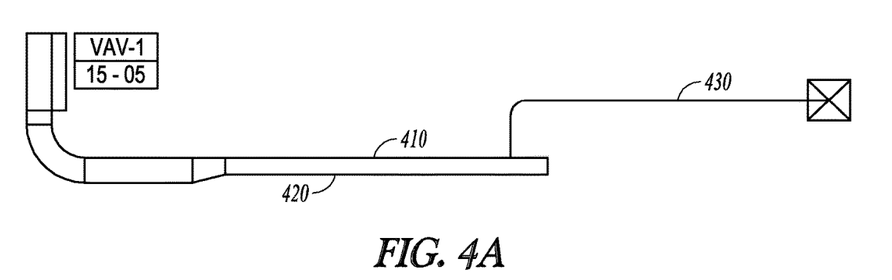
FIGS. 4A, 4B, and 4C are an example of a connection on an MEP drawing.
Figure 4B:
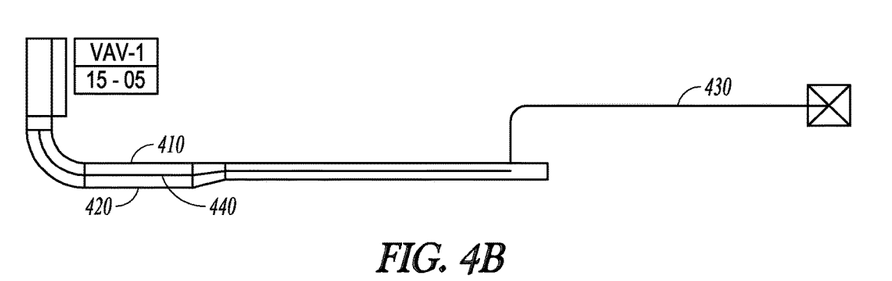
Figure 4C:
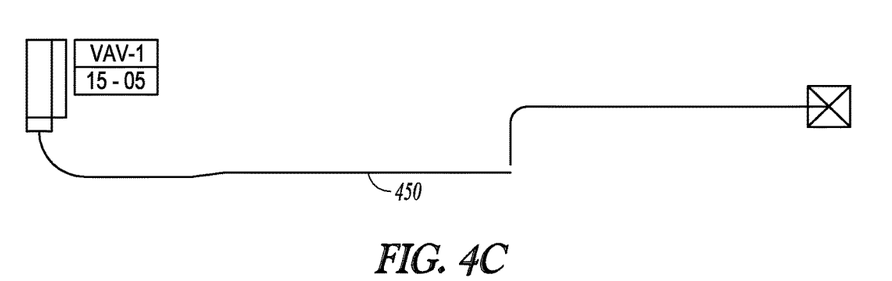
Figure 5A:
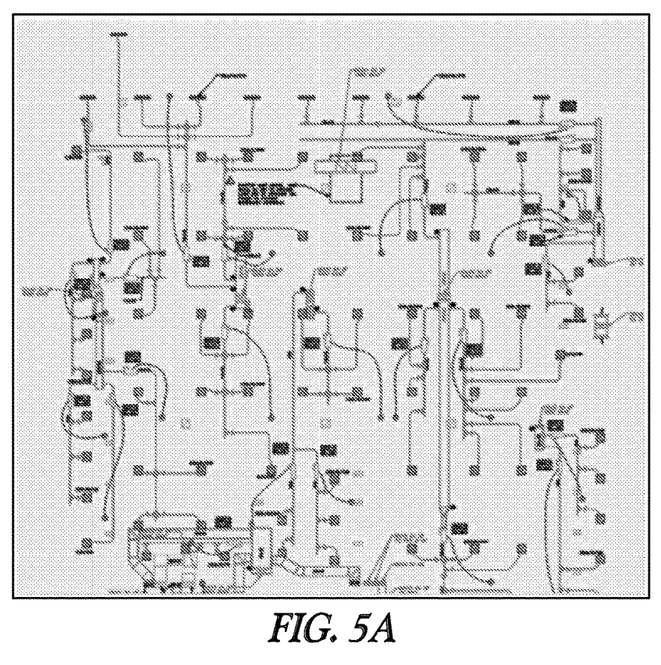
FIG. 5A is an example of an MEP drawing.
Figure 5B:
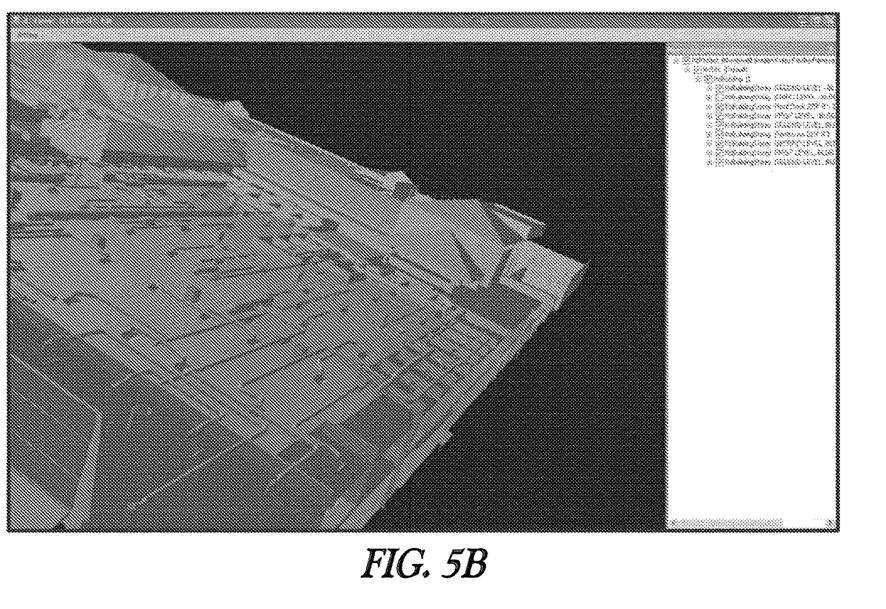
FIG. 5B is an example of a three dimensional drawing generated from the drawing of FIG. 5A using an embodiment of the model driven connection approximation of the present disclosure.

FIGS. 4A, 4B, and 4C illustrate the approximation of a connection. Referring to FIG. 4A, all lines or curves 410, 420, and 430 along the connection are identified. In FIG. 4B, the lines 410 and 420 are approximated into a single connection 440. There are two common methods to approximate the connection. One is selecting the shortest path as the final connection. The other is thinning the path into a single pixel connection. The result is the graph in FIG. 4C, and this graph with the refined connection edge 450 is output to a user interface, processor, or system. FIG. 5A illustrates an example of a raster-based HVAC drawing, and FIG. 5B illustrates the three dimensional object based drawing generated from the raster-based drawing of FIG. 5A.

Figure 6A:
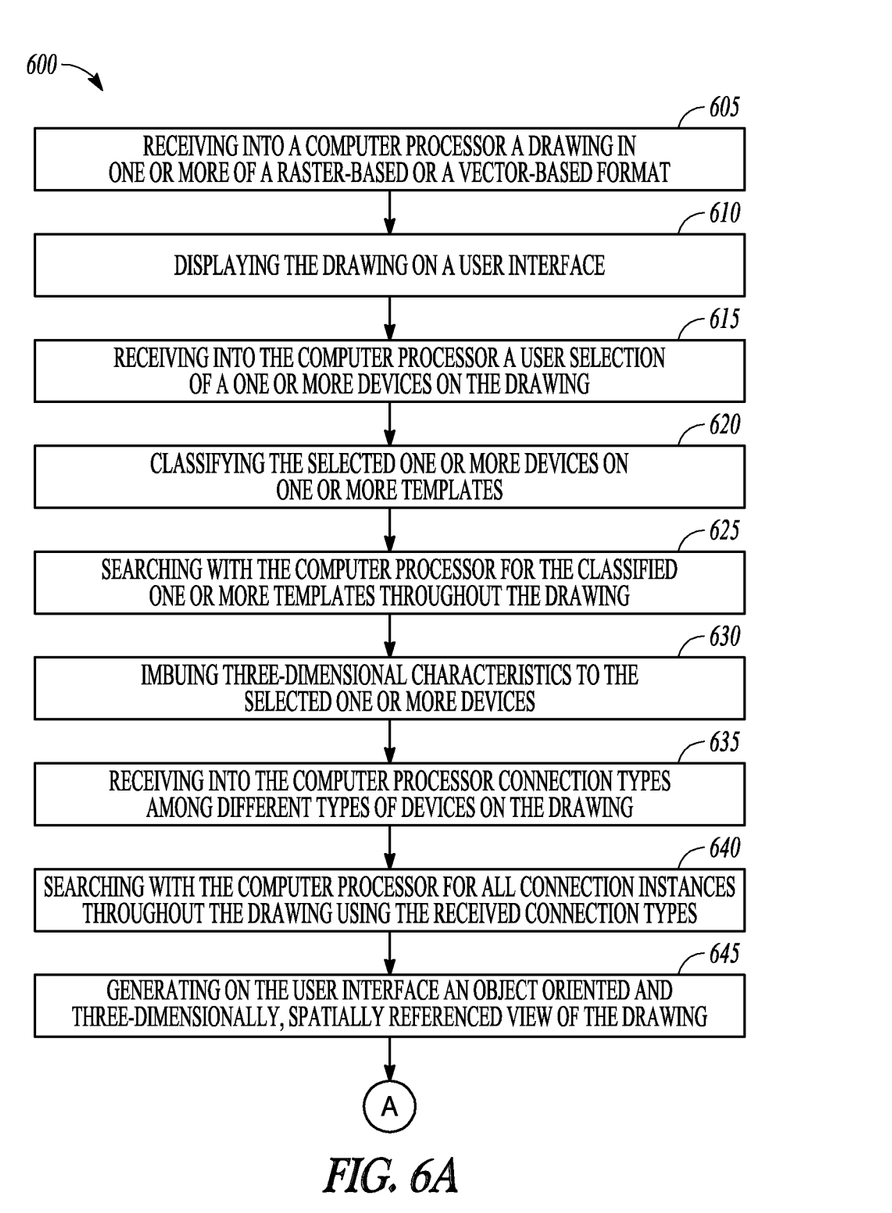
FIGS. 6A and 6B are a flowchart-like diagram illustrating features and steps of a model driven connection approximation embodiment.
Figure 6B:
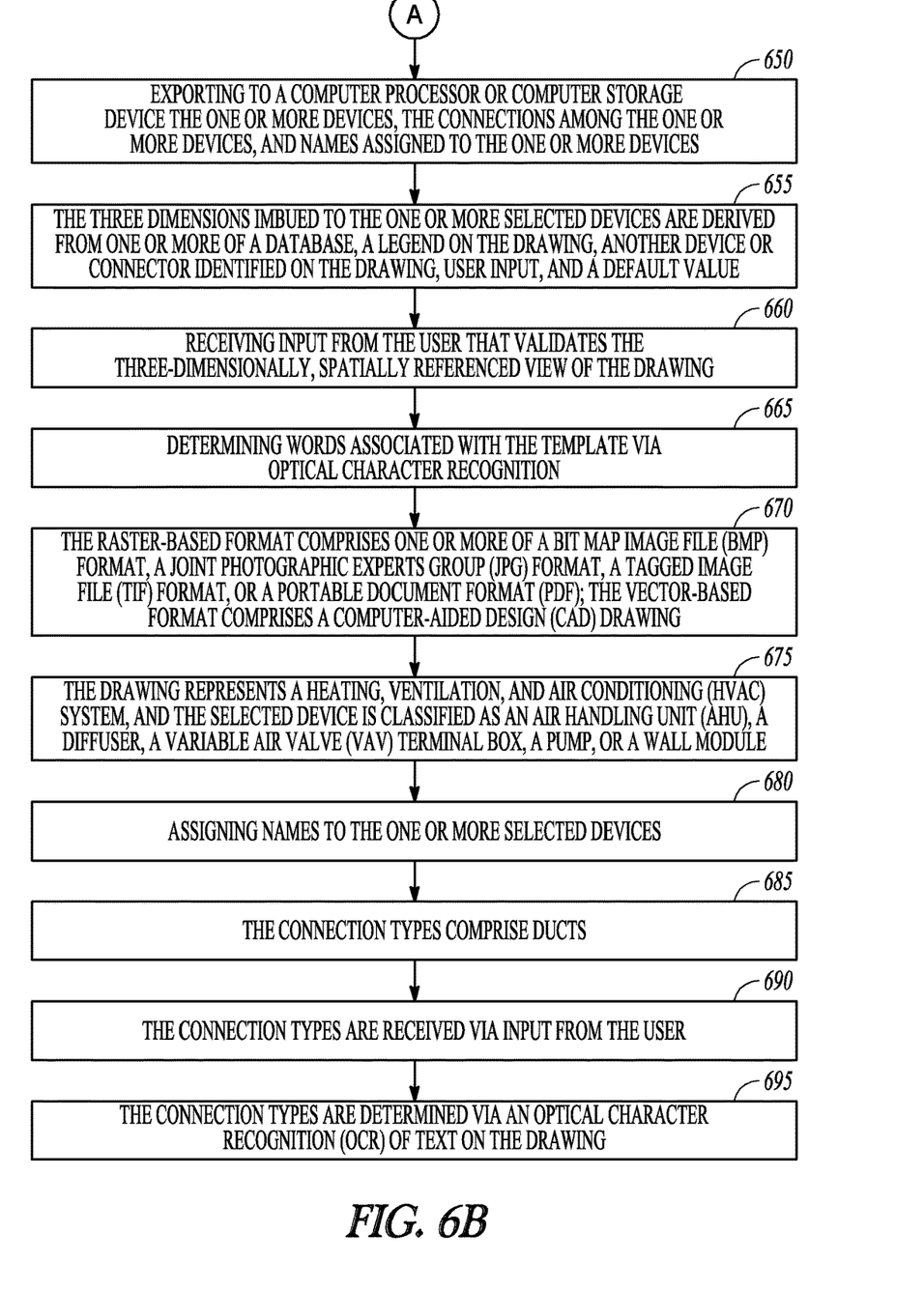

FIGS. 6A and 6B are a flowchart-like diagram illustrating features and steps of an example embodiment 600 of a model driven connection approximation for MEP drawings. FIG. 6 includes a number of process blocks 605-695. Though arranged serially in the example of FIGS. 6A and 6B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 6A and 6B, at 605, a drawing in one or more of a raster-based or a vector-based format is received into a computer processor. At 610, the drawing is displayed on a user interface. At 615, a user selection of one or more devices on the drawing is received into the computer processor. At 620, the selected one or more devices are classified on one or more templates. At 625, a search is executed for the classified one or more templates throughout the drawing. At 630, three-dimensional characteristics are imbued to the selected one or more devices. At 635, connection types among different types of devices on the drawing are received into the computer processor. These connection types can be retrieved from a file or supplied by a user. At 640, a search is performed for all connection instances throughout the drawing using the received connection types. For example, in an HVAC situation, all diffusers and VAVs are identified, and then for each diffuser, there must be a VAV to serve as a supplier for the diffuser. So, it is known to search the drawing for a connection between the diffuser and the VAV. At 645, an object oriented and three-dimensionally, spatially referenced view of the drawing is generated on a user interface.

At 650, the one or more devices, the connections among the one or more devices, and names assigned to the one or more devices are exported to a computer processor or computer storage device. At 655, the three dimensions imbued to the one or more selected devices are derived from one or more of a database, a legend on the drawing, another device or connector identified on the drawing, user input, and a default value. For example, a database can include a table with dimensions of the devices of interest, from which the three-dimensional representation can be generated. A legend on the drawing can include the same dimensions, or can include a representation of a device from which the three dimensional aspects can be obtained. The three dimensional aspects can also be obtained using a similar device on the drawing. Also, a user can simply input the necessary data to generate a three dimensional representation of the device. At 660, input is received from the user that validates the three-dimensionally, spatially referenced view of the drawing.

At 665, optical character recognition is used to determine words that are associated with a template. For example, the drawing may have labels for one or more of the devices on the drawing, indicating what the device is. At 670, it is noted that the raster-based format can include a bit map image file (BMP) format, a joint photographic experts group (JPEG) format, a tagged image file (TIF) format, or a portable document format (PDF). It is further noted that the vector-based format can include a computer-aided design (CAD) drawing.

At 675, it is noted that the drawing can represent a heating, ventilation, and air conditioning (HVAC) system, and the selected device can be classified as an air handling unit (AHU), a diffuser, a variable air valve (VAV) terminal box, a pump, or a wall module. At 680, names can be assigned to these selected devices. At 685, the connection types in the drawings are ducts. At 690, the connection types are received via input from the user, and at 695, the connection types are determined via an optical character recognition (OCR) of text on the drawing.

Figure 7:
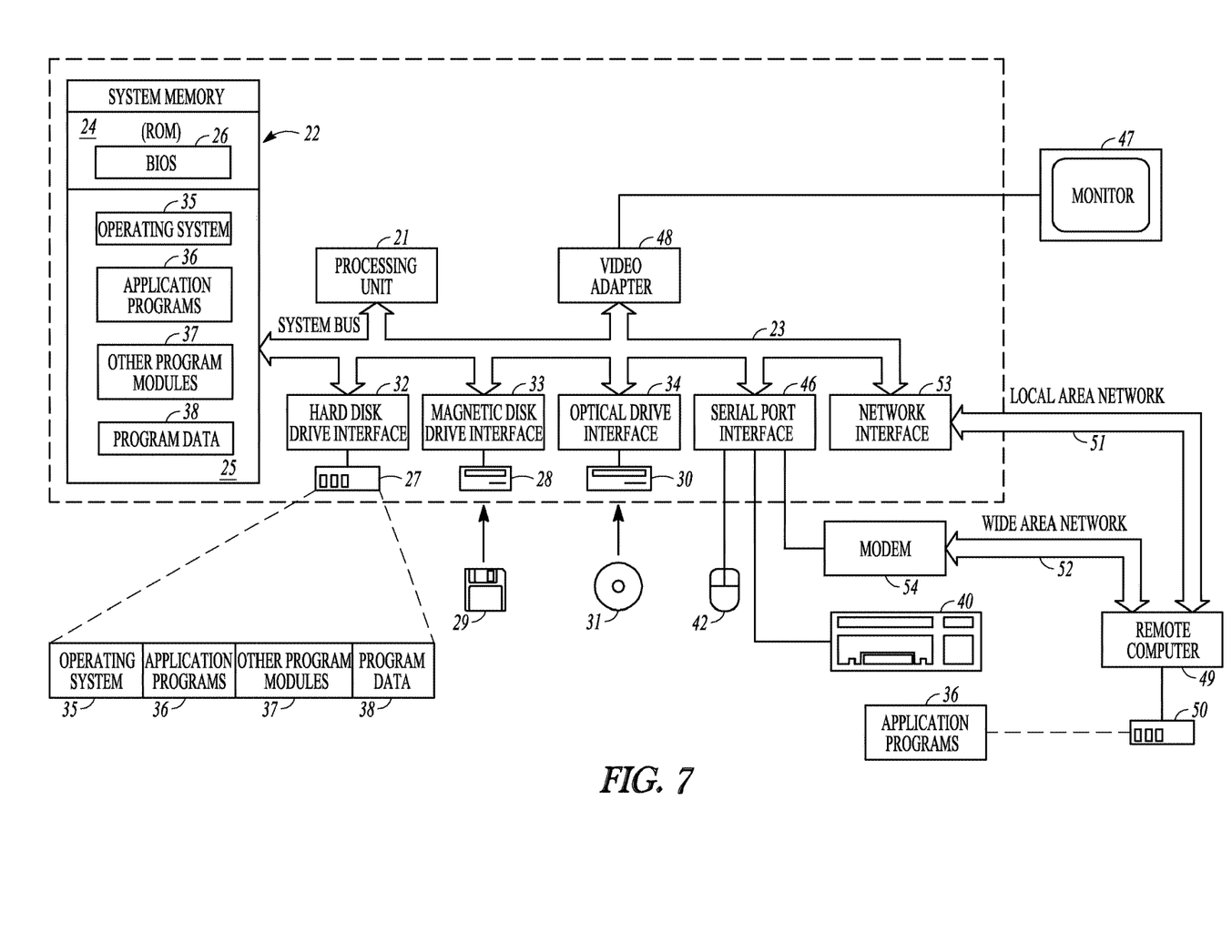
FIG. 7 is a block diagram of an example of a computer system upon which one or more embodiments of the current disclosure can execute.

FIG. 7 is an overview diagram of hardware and an operating environment in conjunction with which embodiments of the invention may be practiced. The description of FIG. 7 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 7, a hardware and operating environment is provided that is applicable to any of the servers and/or remote clients shown in the other Figures.

As shown in FIG. 7, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/0 relative to the computer 20, although only a memory storage device 50 has been illustrated. The logical connections depicted in FIG. 7 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A method comprising:
receiving into a computer processor a drawing in one or more of a raster-based format or a vector-based format;
displaying the drawing on a user interface;
receiving into the computer processor a user selection of one or more devices on the drawing;
classifying the selected one or more devices on one or more templates;
searching with the computer processor for the classified one or more templates throughout the drawing and retrieving properties for the one or more devices;
imbuing three-dimensional characteristics to the selected one or more devices;
receiving into the computer processor connection types among different types of devices on the drawing;
searching with the computer processor for all connection instances throughout the drawing using the received connection types; and
generating on the user interface an object oriented and three-dimensionally, spatially referenced view of the drawing that approximates an entire connection network of the drawing;
wherein the generating the view of the drawing comprises generating a logical graph comprising nodes, the nodes comprising properties of the one or more devices; searching for connections using a connection model according to the type of a source device; traversing all lines and curves from the source device until a detection of a destination device; determining if a connection from the source device to the destination device complies with the connection model; when the connection from the source device to the destination device complies with the connection model, adding the connection as an edge in the logical graph; and recording all lines or curves along the connection as an edge;
wherein the view of the drawing approximates a plurality of lines or curves into a single connection by selecting a shortest path as a final connection and thinning the lines or curves into a single pixel connection;
wherein the drawing represents a heating, ventilation, and air conditioning (HVAC) system, and the selected device is classified as one of an air handling unit (AHL), a diffuser, a variable air valve (VAV) terminal box, a pump, or a wall module; and
wherein the connection types comprise ducts.

2. The method of claim 1, comprising exporting to a computer processor or computer storage device the one or more devices, the connections among the one or more devices, and names assigned to the one or more devices.

3. The method of claim 1, wherein the three dimensions imbued to the one or more selected devices are derived from one or more of a database, a legend on the drawing, another device or connector identified on the drawing, user input, and a default value.

4. The method of claim 1, comprising receiving input from the user interface that validates the three-dimensionally, spatially referenced view of the drawing.

5. The method of claim 1, comprising determining words associated with the template via optical character recognition.

6. The method of claim 1, wherein if the raster-based format is received into the computer processor the raster-based format comprises one or more of a bit map image file (BMP) format, a joint photographic experts group (JPG) format, a tagged image file (TIF) format, or a portable document format (PDF); and wherein if the vector-based format is received into the computer processor the vector-based format comprises a computer-aided design (CAD) drawing.

7. The method of claim 1, comprising assigning names to the one or more selected devices.

8. The method of claim 1, wherein the connection types are received via input from the user interface.

9. The method of claim 1, wherein the connection types are determined via an optical character recognition (OCR) of text on the drawing.

10. A non-transitory computer storage device comprising instructions that when executed by a processor execute a process comprising:
receiving into a computer processor a drawing in one or more of a raster-based format or a vector-based format;
displaying the drawing on a user interface;
receiving into the computer processor a user selection of one or more devices on the drawing;
classifying the selected one or more devices on one or more templates;
searching with the computer processor for the classified one or more templates throughout the drawing and retrieving properties for the one or more devices;
imbuing three-dimensional characteristics to the selected one or more devices;
receiving into the computer processor connection types among different types of devices on the drawing;
searching with the computer processor for all connection instances throughout the drawing using the received connection types; and
generating on the user interface an object oriented and three-dimensionally, spatially referenced view of the drawing that approximates an entire connection network of the drawing;
wherein the generating the view of the drawing comprises generating a logical graph comprising nodes, the nodes comprising properties of the one or more devices; searching for connections using a connection model according to the type of a source device; traversing all lines and curves from the source device until a detection of a destination device; determining if a connection from the source device to the destination device complies with the connection model; when the connection from the source device to the destination device complies with the connection model, adding the connection as an edge in the logical graph; and recording all lines or curves along the connection as an edge;

wherein the view of the drawing approximates a plurality of lines or curves into a single connection by selecting a shortest path as a final connection and thinning the lines or curves into a single pixel connection;

wherein the drawing represents a heating, ventilation, and air conditioning (HVAC) system, and the selected device is classified as one of an air handling unit (AHU), a diffuser, a variable air valve (VAV) terminal box, a pump, or a wall module; and wherein the connection types comprise ducts.

11. The non-transitory computer storage device of claim 10, comprising instructions for exporting to a computer processor or computer storage device the one or more devices, the connections among the one or more devices, and names assigned to the one or more devices.

12. The non-transitory computer storage device of claim 10, wherein the three dimensions imbued to the one or more selected device are derived from one or more of a database, a legend on the drawing, another device or connector identified on the drawing, user input, and a default value.

13. The non-transitory computer storage device of claim 10, wherein if the raster-based format is received into the computer processor the raster-based format comprises one or more of a bit map image file (BMP) format, a joint photographic experts group (JPG) format, a tagged image file (TIF) format, or a portable document format (PDF); and wherein if the vector-based format is received into the computer processor the vector-based format comprises a computer-aided design (CAD) drawing.

14. A system comprising:
a computer processor and computer storage device configured for:
receiving into a computer processor a drawing in one or more of a raster- based format or a vector-based format;
displaying the drawing on a user interface;
receiving into the computer processor a user selection of one or more devices on the drawing;
classifying the selected one or more devices on one or more templates;
searching with the computer processor for the classified one or more templates throughout the drawing and retrieving properties for the one or more devices;
imbuing three-dimensional characteristics to the selected one or more devices;
receiving into the computer processor connection types among different types of devices on the drawing;
searching with the computer processor for all connection instances throughout the drawing using the received connection types; and
generating on the user interface an object oriented and three-dimensionally, spatially referenced view of the drawing that approximates an entire connection network of the drawing;

wherein the generating the view of the drawing comprises generating a logical graph comprising nodes, the nodes comprising properties of the one or more devices; searching for connections using a connection model according to the type of a source device; traversing all lines and curves from the source device until a detection of a destination device; determining if a connection from the source device to the destination device complies with the connection model; when the connection from the source device to the destination device complies with the connection model, adding the connection as an edge in the logical graph; and recording all lines or curves along the connection as an edge;

wherein the view of the drawing approximates a plurality of lines or curves into a single connection by selecting a shortest path as a final connection and thinning the lines or curves into a single pixel connection;

wherein the drawing represents a heating, ventilation, and air conditioning (HVAC) system, and the selected device is classified as one of an air handling unit (AHU), a diffuser, a variable air valve (VAV) terminal box, a pump, or a wall module; and wherein the connection types comprise ducts.

15. he system of claim 14, wherein the computer processor is configured for exporting to a computer processor or computer storage device the one or more devices, the connections among the one or more devices, and names assigned to the one or more devices.

16. The system of claim 14, wherein the three dimensions imbued to the one or more selected devices are derived from one or more of a database, a legend on the drawing, another device or connector identified on the drawing, user input, and a default value.

17. The system of claim 14, wherein if the raster-based format is received into the computer processor the raster-based format comprises one or more of a bit map image file (BMP) format, a joint photographic experts group (JPG) format, a tagged image file (TIF) format, or a portable document format (PDF); wherein if the vector-based format is received into the computer processor the vector-based format comprises a computer-aided design (CAD) drawing.

* * * * *